Oct. 23, 1951 E. L. SCHEIDENHELM ET AL 2,572,203
CUTTER FOR VINE CROPS
Filed Dec. 19, 1949 4 Sheets-Sheet 1

INVENTOR.
Horace D. Hume
Earl L. Scheidenhelm
By Seth Wells Atty

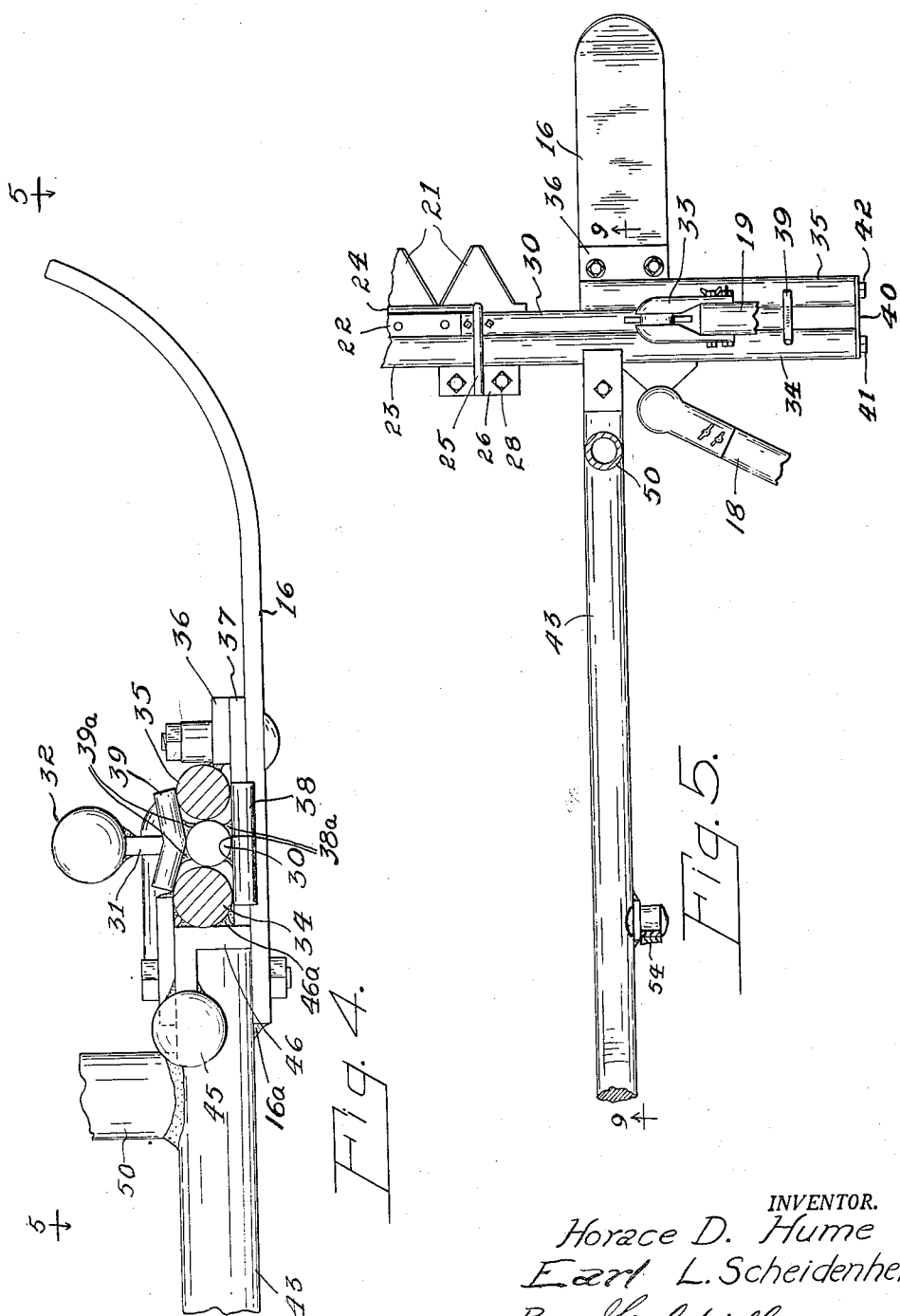

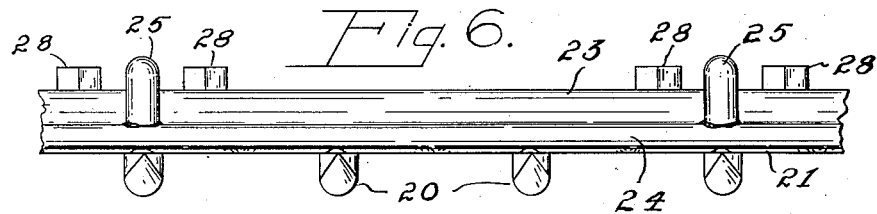
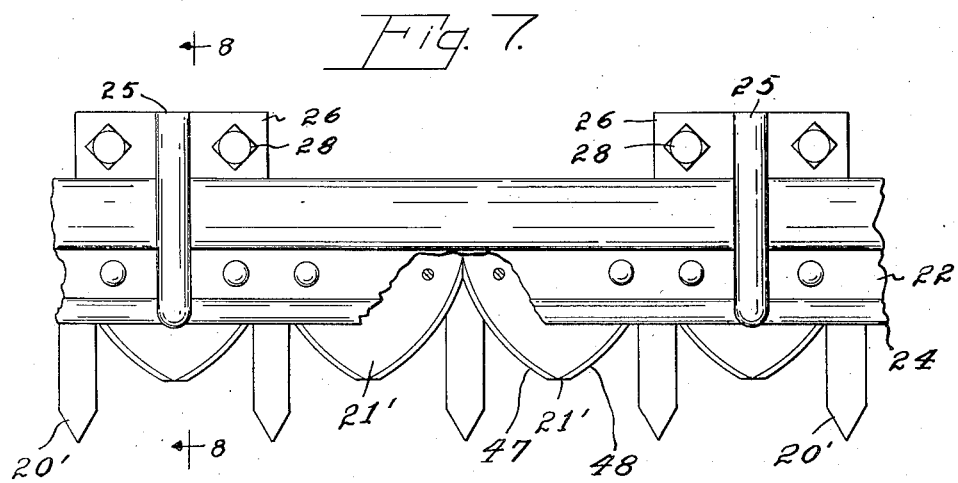
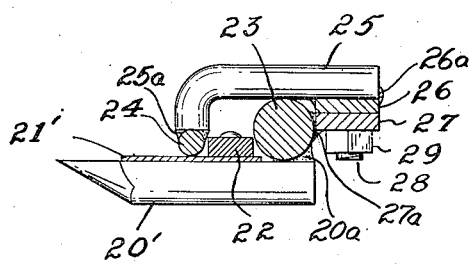
INVENTOR.
Horace D. Hume
Earl L. Scheidenhelm
By Fred Wells Atty.

Oct. 23, 1951    E. L. SCHEIDENHELM ET AL    2,572,203
CUTTER FOR VINE CROPS

Filed Dec. 19, 1949      4 Sheets-Sheet 4

INVENTOR.
Horace D. Hume
Earl L. Scheidenhelm
By Greek Wells, Atty

Patented Oct. 23, 1951

2,572,203

UNITED STATES PATENT OFFICE 2,572,203

CUTTER FOR VINE CROPS

Earl L. Scheidenhelm and Horace D. Hume, Mendota, Ill.; said Scheidenhelm assignor to said Hume Application December 19, 1949, Serial No. 133,778

5 Claims. (Cl. 55—63)

The present invention relates to improvements in a cutter for vine crops etc.

It is the purpose of this invention to provide an improved cutter bar, sickle and mounting means therefor suitable for harvesting Lima beans and similar vine crops where the seed pods lie close to the ground and on the ground. Crops of this type are ordinarily planted in rows and cultivated during the growing season. In cultivating, ridges of dirt are formed against the row of vines and the seed pods oftentimes rest on these ridges of dirt so that it is impossible to cut the vines above the ground surface without destroying a substantial part of the crop.

According to the present invention a cutter bar is provided that will cut through the ridges of dirt, getting all of the beans. The construction comprises a back bar and a knife cap with connecting braces between the knife cap and the back bar, all of which are smooth round surfaced bars so as to leave no corners or flat surface for the soil to clog or pack upon. The sickle head and guides are also made of round surfaced bars. The invention contemplates also a novel knife for the sickle which avoids the wedging of pebbles between the knives and the guards that takes place when a sickle of the ordinary construction is operated in pebbly soil.

The nature and advantages of the invention will appear more fully from the following description and the accompanying drawings illustrating a preferred construction.

In the drawings:

Figure 4 is an enlarged sectional view taken on the line 4—4 of Figure 1 with the pitman rod and connecting brace rod removed;

Figure 5 is a plan section taken substantially on the line 5—5 of Figure 4;

Figure 6 is a front face view of the cutter bar on an enlarged scale;

Figure 7 is a fragmentary plan view illustrating the cutter bar with a modified knife;

Figure 8 is a sectional view taken on the line 8—8 of Figure 7;

Figure 1:
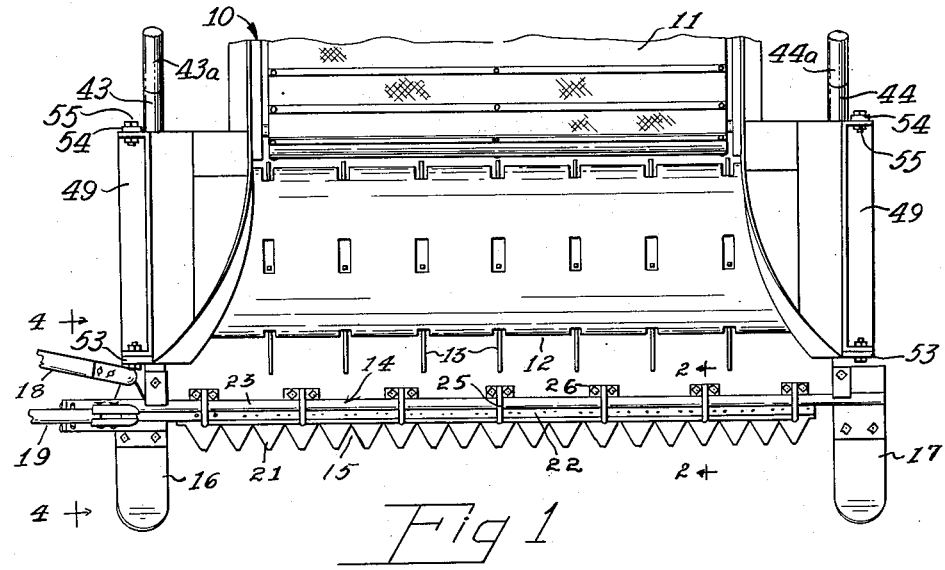
Figure 1 is a fragmentary plan view of a vine crop harvester showing our improved cutter bar in combination with a conveyor for elevating the cut vines.

Referring now to the drawings, the numeral 10 indicates a conveyor frame which embodies an elevating draper 11 and a rotating pick up device 12 with receding teeth 13 combined with a cutter bar 14 and a sickle 15. The cutter bar is supported on shoes 16 and 17 and is braced by a connecting rod 18 which extends to the frame of a suitable power mechanism, not shown, for operating the pitman rod 19 that drives the sickle 15.

Figure 2:
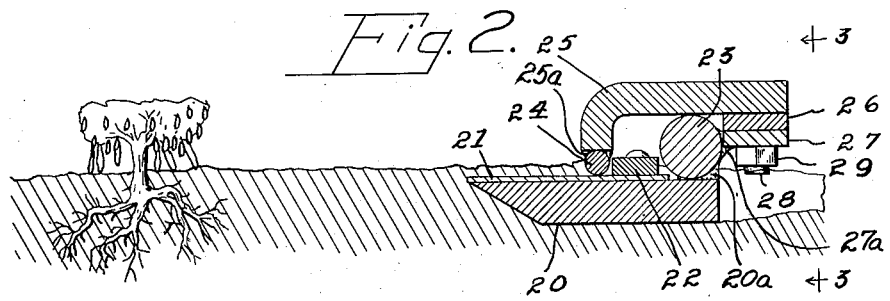
Figure 2 is a somewhat diagrammatic view taken on the line 2—2 of Figure 1 and illustrating the manner in which the cutter bar operates below the surface of the soil.
Figure 3:
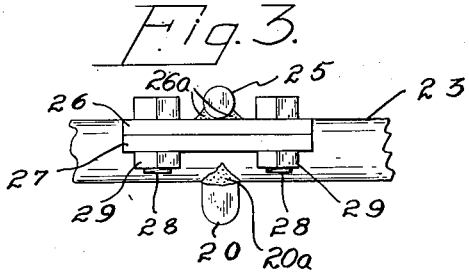
Figure 3 is an enlarged fragmentary view looking to the left from the line 3—3 of Figure 2.
Figure 10:
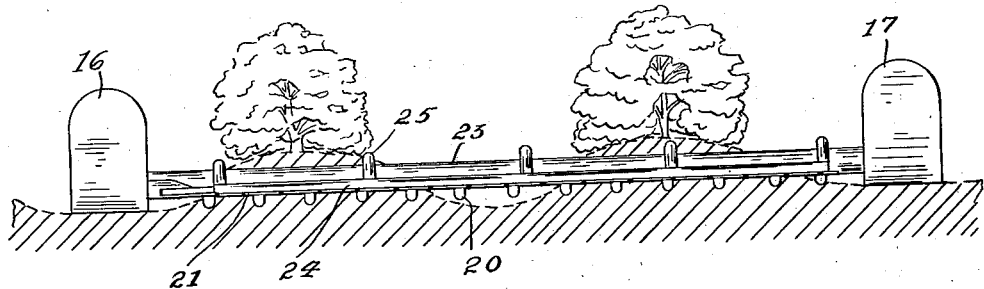
Figure 10 is a somewhat diagrammatic front view of the cutter bar and its relation to the ground and to the plants being harvested.

In harvesting Lima beans and similar crops, it is necessary as outlined hereinbefore, to cut the vines below the surface of the soil. Figures 2 and 10 illustrate diagrammatically the way in which the present device operates to engage the stalk of the vine beneath the soil surface. The cutter bar includes round bottom knife guards 20 beneath the knives 21 of the sickle. The knives are secured to a sickle bar 22 which is on top of the knives, the cutting edges of the knives riding directly on the guards 20. The cutter bar comprises a main back bar 23 of round shafting to which the guards 20 are welded at 20a. A round cap rod 24 lies directly over the knives 21 to hold them down and is spaced from the bar 23 to provide a slot in which the sickle bar runs. The cap rod 24 is connected to the back bar 23 by support rods constructed of round rod sections 25 that are welded at 25a to the cap rod and extended directly upward therefrom and then rearwardly over the bar 23. Removable connection between the support rods 25 and the bar 23 is provided by plates 26 welded at 26a to the rods 25 and plates 27 welded at 27a to the bar 23. Bolts 28 and nuts 29 connect the bars 26 and 27 together. It will be noted that with this construction all of the parts except the sickle bar and its knife present smooth rounded surfaces to the soil that flows over the sickle bar as it is operated and advanced through the soil just below the surface. The plates 26 and 27 being to the rear of the bar 23, do not present any problem of clogging with dirt.

The sickle head itself and the guides therefor are also constructed to prevent clogging with dirt. The sickle head is a round rod 30, having an upstanding plate 31 welded thereto at 31a and supporting a ball member 32 to which a socket 33 on the pitman rod is secured. The head 30 is guided between an extending portion 34 of the back bar 23 and another round bar 35 which is mounted on the shoe 16. The bar 35 is supported by a plate 36 which is bolted to the shoe 16, a reenforcing plate 37 being used beneath the plate 36 and extending beneath the head 30 of the sickle.

The head 30 is held against vertical movement between the round bar portions 34 and 35 by a lower round bar 38 and an upper round bar 39 welded at 38a and 39a to the sickle head near its free end. A cross tie 40 is used to connect the ends of the bars 34 and 35 and is held by means of screw bolts 41 and 42. The cross tie 40 is removed when it is desired to withdraw the sickle. It will be appreciated that the bar 35 can be removed when the sickle head and sickle are to be withdrawn.

The shoes 16 and 17 are welded as indicated at 16a to frame supporting, round members 43 and 44 which are connected to the frame 10 of the conveyor. A ball 45 for the brace rod 18 is secured to an angle plate 46 that is welded at 46a to the extension 34 of the bar 23.

Figures 7 and 8 of the drawings illustrate a modified form of sickle knife 21' which has been found particularly useful in cutting crops in the manner described hereinbefore. This knife is shorter from front to back than the conventional knife so that the guards 20' extend beyond the forward ends of the knife. The cutting edges 47 and 48 of the knives 21' are curved from the front end of the knife to present a convex edge forwardly. In stony ground this particular construction is highly advantageous in preventing damage to the knives since the pebbles and small stones encountered do not wedge between the knives and the guards as readily as in a straight edge knife. The other parts of the cutter bar and sickle are the same in the modified form as in the main form of the invention.

Figure 9:
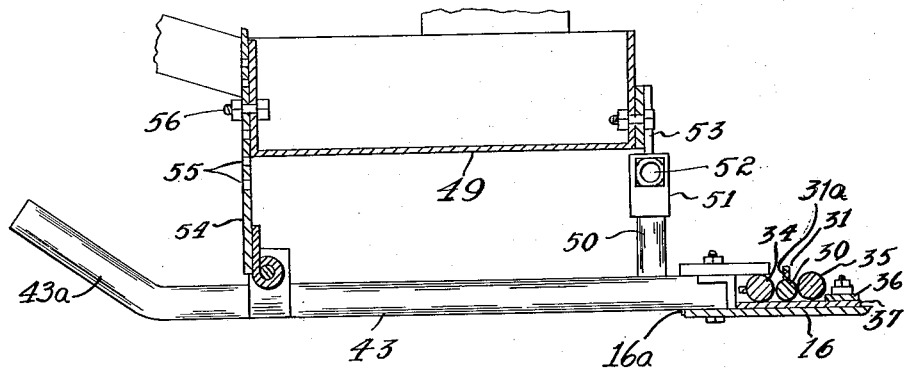
Figure 9 is a sectional view on the line 9—9 of Figure 5.

The supporting members 43 and 44 are adjustable with respect to the main frame 10. The rear ends of the members 43 and 44 are bent upward as shown in Figure 1 at 43a and 44a. A frame portion 49 is provided at each side of the main frame. The adjusting means is the same for both members 43 and 44. The details of this adjusting means is shown best in Figure 9. Each of the members 43 and 44 has a post 50 at its front end which post has a yoke 51 at the top. The yoke 51 is pivoted by a pin 52 to a bracket 53 that is bolted to the front end of the portion 49. At the rear end of each of the members 43—44 a strap 54 is pivoted. This strap has several apertures 55 in it and is fastened to the rear end of the frame portion 49 by a bolt 56. The apertures afford ample adjustment for the cutter bar. By adjusting the straps 54 upward or downward on the rear ends of the frame portion 49, the members 43 and 44 are adjusted angularly about the pivot pins 52 to set the cutter bar at the proper angle to the frame 10.

It is believed that the nature and advantages of the invention will be apparent from the foregoing description.

Having thus described our invention, we claim:

1. A cutter for Lima beans and similar crops comprising, a back bar which is round in cross section, spaced guards secured to the bottom of said back bar and extending forwardly from the back bar, said guards having rounded bottom surfaces, a sickle bar, knives secured to the sickle bar against the bottom face thereof, the knives resting on the guards, a cap rod spaced from the back bar and overlying the knives in front of the sickle bar and support rods secured to the rear side of the back bar and projecting forwardly over the back bar and downwardly to the cap rod and fixed to the cap rod.

2. A cutter bar assembly for harvesting Lima beans and similar crops, comprising in combination a round back bar, a round cap rod and spaced support rods on the back bar holding the cap rod spaced forwardly from and parallel to the bar to provide a guide channel for a sickle bar, and flat topped round bottomed guards fixed on said back bar and extended forwardly therefrom beneath and spaced from the cap rod and cooperating therewith to guide knives on the sickle bar.

3. A cutter for Lima beans and similar crops comprising, a back bar which is round in cross section, spaced guards secured to the bottom of said back bar and extending forwardly from the back bar, said guards having rounded bottom surfaces, a sickle bar, knives secured to the sickle bar against the bottom face thereof, the knives resting on the guards, a cap rod supported by the back bar and overlying the knives in front of the sickle bar, the back bar being extended beyond the ends of the cap rod, ground engaging shoes secured to the extended portions of the back bar, a round extension on said sickle bar, a round guide bar on one of said shoes parallel to one extended portion of the back bar and forming therewith a channel for the round extension of the sickle bar.

4. A cutter for Lima beans and similar crops comprising, a back bar which is round in cross section, spaced guards secured to the bottom of said back bar and extending forwardly from the back bar, said guards having rounded bottom surfaces, a sickle bar, knives secured to the sickle bar against the bottom face thereof, the knives resting on the guards, a cap rod supported by the back bar and overlying the knives in front of the sickle bar, the back bar being extended beyond the ends of the cap rod, ground engaging shoes secured to the extending portions of the back bar, a round extension on said sickle bar, a round guide bar on one of said shoes parallel to one extended portion of the back bar and forming therewith a channel for the round extension of the sickle bar and, an upper round bar and a lower round bar on the sickle bar extension holding the extension in the channel between the extended portion of the back bar and the guide bar.

5. A cutter for Lima beans and similar crops comprising, a back bar which is round in cross section, spaced guards secured to the bottom of said back bar and extending forwardly from the back bar, said guards having rounded bottom surfaces, a sickle bar, knives secured to the sickle bar against the bottom face thereof, the knives resting on the guards, a cap rod supported by the back bar and overlying the knives in front of the sickle bar, the back bar being extended beyond the ends of the cap rod, ground engaging shoes secured to the extended portions of the back bar, a round extension on said sickle bar, a round guide bar on one of said shoes parallel to one extended portion of the back bar and forming therewith a channel for the round extension of the sickle bar, and a removable cross tie connecting the outer end of the guide bar to the extended portion of the back bar.

EARL L. SCHEIDENHELM.
HORACE D. HUME.

REFERENCES CITED

The following references are of record in the file of this patent:

UNITED STATES PATENTS

| Number | Name | Date |
| --- | --- | --- |
| 489,062 | Wilson | Jan. 3, 1893 |
| 1,212,880 | Baldwin | Jan. 16, 1917 |
| 1,947,123 | Carlson | Feb. 13, 1934 |

FOREIGN PATENTS

| Number | Country | Date |
| --- | --- | --- |
| 392,041 | Great Britain | May 11, 1933 |